United States Patent Office 3,055,919
Patented Sept. 25, 1962

3,055,919
17α-(LOWER ALKANOYL)OXY-2-HALOPREGNA-4,6-DIENE-3,20-DIONES
Raymond M. Dodson, Park Ridge, and Paul B. Sollman, Wilmette, Ill., assignors to G. D. Searle & Co., Chicago, Ill., a corporation of Delaware
No Drawing. Filed May 27, 1960, Ser. No. 32,133
4 Claims. (Cl. 260—397.4)

The present invention relates to 2-halogenated steroids of the pregnane series and, more particularly, to 17α-(lower alkanoyl)oxy-2-halopregna-4,6-diene-3,20-diones as represented by the structural formula

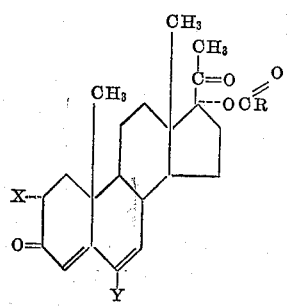

wherein R is a lower alkyl radical, X is a halo radical, and Y is selected from the group consisting of hydrogen, methyl, and halo radicals.

The lower alkyl radicals represented by R are exemplified by methyl, ethyl, propyl, butyl, pentyl, hexyl, and the branched-chain isomers thereof.

The halo radicals encompassed in the X and Y terms are fluoro, chloro, bromo, and iodo.

Suitable starting materials for the manufacture of the instant compounds are the 17α-(lower alkanoyl)oxypregna-4,6-diene-3,20-diones represented by the structural formula

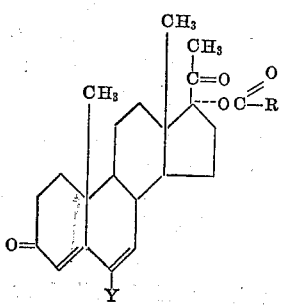

wherein R and Y have the identical meanings as defined supra.

The preferred embodiments of this invention are those compounds possessing a 6-methyl substitutent.

The instant 2α-bromo- and 2α-chloro-6-methyl compounds are prepared by treating the above starting materials, wherein Y is a methyl radical, with the corresponding cupric halide in a suitable ionic solvent such as methanol or, alternatively, with a solution of the free halogen in a suitable solvent mixture such as acetic acid-chloroform. For example, 17α-acetoxy-6-methylpregna-4,6-diene-3,20-dione yields 17α-acetoxy-2α-bromo-6-methylpregna-4,6-diene-3,20-dione upon treatment with cupric bromide in methanol, and also 17α-acetoxy-2α-chloro-6-methylpregna-4,6-diene-3,20-dione when treated in chloroform with a solution of chlorine in acetic acid.

An alternate route for the production of the instant 17α-(lower alkanoyl)oxy-2α-bromopregna-4,6-diene-3,20-diones involves the reaction of 17α-(lower alkanoyl)oxy-6-methylpregn-4-ene-3,20-diones with bromine. As a specific example, 17α-acetoxy-6-methylpregn-4-ene-3,20-dione is treated with two molecular equivalents of bromine in acetic acid to yield the aforementioned 17α-acetoxy-2α-bromo-6-methylpregna-4,6-diene-3,20-dione.

Treatment of the instant 2α-bromo-6-methyl compounds with an alkali metal iodide results in the corresponding 2α-iodo compounds of this invention. Typically, 17α-acetoxy-2α-bromo-6-methylpregna-4,6-diene-3,20-dione in acetone is allowed to react with sodium iodide to produce 17α-acetoxy-2α-iodo-6-methylpregna-4,6-diene-3,20-dione.

The 2α-fluoro-6-methyl compounds of this invention are manufactured from the aforementioned 17α-(lower alkanoyl)pregna-4,6-diene-3,20-diones by a 2-step process involving condensation with diethyl oxalate to afford the 2-ethoxalyl derivatives, which are then allowed to react with perchloryl fluoride to yield the instant 2α-fluoro-6-methyl compounds. As a specific example, the aforementioned 17α-acetoxy-6-methylpregna-4,6-diene-3,20-dione in benzene is condensed with diethyl oxalate in the presence of sodium methoxide to afford the corresponding 2-ethoxalyl derivative, which is treated with perchloryl fluoride in methanol to yield 17α-acetoxy-2α-fluoro-6-methylpregna-4,6-diene-3,20-dione.

The instant 2α-halo-6-unsubstituted and 2α,6-dihalo compounds are obtained from the corresponding 2-unsubstituted starting materials by processes analogous to those described supra for the manufacture of the 2-halo-6-methyl compounds of this invention. As a specific illustration, 17α-acetoxy-6-chloropregna-4,6-diene-3,20-dione is treated with cupric chloride in methanol to afford 17α-acetoxy-2α,6-dichloropregna-4,6-diene-3,20-dione.

The compounds of this invention are useful as a result of their valuable pharmacological properties. They possess hormonal activity as evidenced, for example, by their progestational properties. In addition, they are antiinflammatory agents.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight unless otherwise noted.

Example 1

To a suspension of 5 parts of 17α-acetoxy-6-methylpregna-4,6-diene-3,20-dione in 160 parts of methanol is added 20 parts of cupric bromide, and the resulting mixture is stirred at room temperature for about 3 hours, then slowly poured into approximately 1000 parts of water. The precipitate which forms is removed by filtration and extracted with acetone. This organic extract is concentrated to afford crystals of 17α-acetoxy-2α-bromo-6-methylpregna-4,6-diene-3,20-dione, M.P. about 210–212°. Further purification by trituration with methanol produces material with a melting point of about 217–219°. It displays an ultraviolet absorption maximum at about 293.5 millimicrons with a molecular extinction coefficient of about 23,600.

Example 2

A solution of 3.8 parts of 17α-acetoxy-6-methyl-pregna-4,6-diene-3,20-dione and 9 parts of cupric bromide in 160 parts of methanol is stored at room temperature for about 3 days. The crystals which form are collected by filtration and dried to yield 17α-acetoxy-2α-bromo-6-methyl-pregna-4,6-diene-3,20-dione, M.P. about 218° (decomposition). Recrystallization from acetone-hexane results in a sample whose melting point is dependent upon the rate of heating. When the sample is heated slowly (3–4°/ minute) from room temperature, a melting point of 205–210° is observed. When the sample is placed in the melting point apparatus at 190° and heated at a rate of 7–8°/minute, the crystals melted at about 221–222°. This material displays an $[\alpha]_D$ in chloroform of +83°, and possesses an infrared spectrum identical with that of the product of Example 1.

*Example 3*

To a solution of 3.86 parts of 17α-acetoxy-6α-methylpregn-4-ene-3,20-dione in 105 parts of acetic acid is added dropwise at room temperature a solution of 3.2 parts of bromine in 52.5 parts of acetic acid. The reaction mixture is stirred for about 2 hours, then diluted with water, and the crystals which form are collected by filtration and dried to yield 17α-acetoxy-2α-bromo-6-methylpregn-4,6-diene-3,20-dione. This material displays a melting point of 208–211° (decomposition) when placed on a Fisher-Johns melting point block at 190° and heated at the rate of 10–12°/minute. Its identity with the substances of Examples 1 and 2 is confirmed by comparison of their infrared spectra.

*Example 4*

A solution of 7.7 parts of 17α-acetoxy-6-methyl-pregna-4,6-diene-3,20-dione and 10.8 parts of cupric chloride in 80 parts of methanol is heated at reflux for about one hour. Dilution of the reaction mixture with water results in crystallization of the product, which is collected by filtration and dried, resulting in 17α-acetoxy-2α-chloro-6-methylpregna-4,6-diene-3,20-dione, M.P. about 248–251°. Recrystallization from acetone-hexane affords a sample possessing a melting point of about 252–254°. It displays an $[\alpha]_D$ in chloroform of +79° and an ultraviolet absorption maximum of about 291.5 millimicrons with a molecular extinction coefficient of about 24,200.

*Example 5*

A solution of 1.36 parts of 17α-acetoxy-6-methyl-pregna-4,6-diene-3,20-dione in 105 parts of chloroform is treated at −70° with 8.3 parts by volume of a 0.445 molar chlorine solution in acetic acid. The resulting mixture is stored at about −5° for 27 days, then washed with water and concentrated to dryness. Crystallization from acetone-hexane prodces 17α-acetoxy-2α-chloro-6-methylpregna-4,6-diene-3,20-dione, which is identical with the substance produced by the process of Example 4.

*Example 6*

A mixture of 5 parts of 17α-acetoxy-2α-bromo-6-methylpregna-4,6-diene-3,20-dione, 36 parts of sodium iodide, and 120 parts of acetone is heated at reflux for about 18 hours. Dilution with water causes separation of needle-like crystals which are collected by filtration and dried to afford 17α-acetoxy-2α-iodo-6-methylpregna-4,6-diene-3,20-dione. Recrystallization from benzene-hexane affords a sample melting at about 196–197° with decomposition, when placed on a melting point block at 180° and heated at the rate of 12°/minute. This substance possesses and $[\alpha]_D$ in chloroform of +79° and an ultraviolet absorption maximum of about 295 millimicrons with a molecular extinction coefficient of about 23,000.

*Example 7*

To 80 parts of benzene is added 2.4 parts by volume of a 4.23 N solution of sodium methoxide in methanol and the resulting mixture is distilled until a vapor temperature of 78° is reached. To this dry suspension is added successively 18 parts of benzene, 0.8 part of ethanol, 2.84 parts of 17α-acetoxy-6-methylpregna-4,6-diene-3,20-dione, and 1.8 parts of diethyl oxalate. This mixture is stirred for about 15 minutes and the resulting yellow solid collected by filtration to afford the sodium salt of 17α-acetoxy - 2 - ethoxalyl - 6 - methylpregna - 4,6 - diene - 3,20- dione. Dilution of the filtrate with ether yields a further quantity of this sodium salt.

A solution of 2 parts of the aforementioned sodium salt of 17α-acetoxy-2-ethoxalyl-6-methylpregna-4,6-diene-3,20-dione in 40 parts of methanol is cooled to −10°, then treated with a cold solution of 2 parts of perchloryl fluoride in 32 parts of methanol. The temperature is not allowed to rise above 5° during the addition and is kept at that temperature for about 2 hours longer. This reaction mixture is then treated with 4.6 parts by volume of a 4.23 N solution of sodium methoxide in methanol, and the resulting mixture is stirred for about 30 minutes at 0–5°. Concentration in vacuo to a small volume followed by treatment with about 500 parts of water produces a precipitate, which is collected by filtration and extracted with about 265 parts of hot benzene. This organic extract is clarified by filtration, then concentrated to an oil. Crystallization from ether followed by two recrystallizations from acetone-hexane affords pure 17α-acetoxy-2α-fluoro-6-methylpregna-4,6-diene-3,20-dione, M.P. about 235–236.5°. This substance displays an ultraviolet absorption maximum of about 292.5 millimicrons with a molecular extinction coefficient of about 22,000, and exhibits also infrared maxima at about 5.75, 5.91, 6.14, 6.32, 7.90, 7.98, 10.40, 11.27, and 11.40 microns.

*Example 8*

By substituting an equivalent quantity of 17α-hexanoyloxy-6-methylpregna-4,6-diene-3,20-dione for 17α-acetoxy-6-methylpregna-4,6-diene-3,20-dione in the appropriate process disclosed in Example 1–7, 2α-bromo-17α-hexanoyloxy-6-methylpregna-4,6-diene-3,20-dione, 2α-chloro-17α - hexanoyloxy - 6-methylpregna-4,6-diene-3,20-dione, 2α - fluoro - 17α-hexanoyloxy-6-methylpregna-4,6-diene-3,20-dione, and 17α-hexanoyloxy-2α-iodo-6-methylpregna-4,6-diene-3,20-dione are obtained.

What is claimed is:
1. A compound of the structural formula

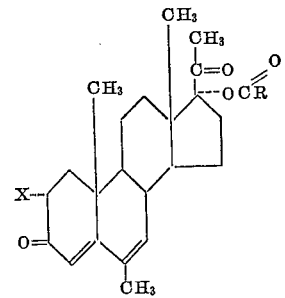

wherein R is a lower alkyl radical and X is a halo radical.

2. 17α - acetoxy-2α-bromo-6-methylpregna-4,6-diene-3,20-dione.

3. 17α - acetoxy-2α-chloro-6-methylpregna-4,6-diene-3,20-dione.

4. 17α - acetoxy - 2α-iodo-6-methylpregna-4,6-diene-3,20-dione.

References Cited in the file of this patent
UNITED STATES PATENTS
2,891,079    Dodson et al. _____ June 16, 1959

OTHER REFERENCES

Kissman et al.: J.A.C.S., vol. 82 (1960), pages 2312–2317 relied on.